United States Patent
Yokoyama (10) Patent No.: US 9,387,837 B2
(45) Date of Patent: Jul. 12, 2016

(54) BRAKE DEVICE

(71) Applicant: HITACHI AUTOMOTIVE SYSTEMS, LTD., Ibaraki (JP)

(72) Inventor: Wataru Yokoyama, Kanagawa (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/086,218

(22) Filed: Nov. 21, 2013

(65) Prior Publication Data

US 2014/0151164 A1    Jun. 5, 2014

(30) Foreign Application Priority Data

Nov. 30, 2012  (JP) .................. 2012-262548

(51) Int. Cl.
| | |
|---|---|
| *B60T 7/12* | (2006.01) |
| *B60T 1/06* | (2006.01) |
| *B60T 17/22* | (2006.01) |
| *B60T 13/58* | (2006.01) |
| *B60T 13/74* | (2006.01) |
| *B60T 8/88* | (2006.01) |

(52) U.S. Cl.
CPC . *B60T 7/12* (2013.01); *B60T 1/065* (2013.01); *B60T 8/885* (2013.01); *B60T 13/588* (2013.01); *B60T 13/741* (2013.01); *B60T 17/22* (2013.01); *B60T 17/221* (2013.01); *B60T 2270/402* (2013.01)

(58) Field of Classification Search
CPC ............ B60T 7/12; B60T 17/22; B60T 1/065
USPC ....................................................... 188/72.3
See application file for complete search history.

(56) References Cited

U.S. PATENT DOCUMENTS

| | | | | |
|---|---|---|---|---|
| 2002/0023818 A1* | 2/2002 | Yanaka | ..................... | B60T 7/02 192/219.4 |
| 2004/0201270 A1* | 10/2004 | Suzuki | .................. | B60T 13/741 303/20 |
| 2007/0170775 A1* | 7/2007 | Uchimura | ............... | B60T 7/107 303/112 |
| 2008/0053760 A1* | 3/2008 | Oikawa | ................. | B60T 13/745 188/72.4 |
| 2010/0051395 A1* | 3/2010 | Sano | ........................ | B60T 1/005 188/162 |

FOREIGN PATENT DOCUMENTS

JP      2010-202159        9/2010

* cited by examiner

*Primary Examiner* — Robert A Siconolfi
*Assistant Examiner* — San Aung
(74) *Attorney, Agent, or Firm* — Wenderoth, Lind & Ponack, L.L.P.

(57) ABSTRACT

A brake device capable of appropriately releasing a pressing-member retention mechanism when a failure is detected. When a failure of one of a pair of disc brakes (31) is detected, an electric actuator (43) of the non-faulty disc brake (31) is driven to a release side in response to a release request based on a parking brake switch (18) in a case where a state of the faulty disc brake (31) is stored as a "released state" in a storage section (19A) of a parking brake control device (19). In contrast, in a case where the state of the faulty disc brake (31) is stored as an "engaged state" in the storage section (19A), the electric actuator (43) of the non-faulty disc brake (31) is inhibited from being driven to the release side even when the release request based on the parking brake switch (18) is issued.

14 Claims, 4 Drawing Sheets

BRAKE DEVICE

BACKGROUND OF THE INVENTION

1. Technical Field

The present invention relates to a brake device for applying a braking force to a vehicle such as an automobile.

2. Description of the Related Art

As a brake device provided to a vehicle such as an automobile, there is known a brake device with an electric parking brake function, which is actuated based on driving of an electric motor. The brake device described above is configured so that a friction member is held in abutment against a rotary member which rotates with a wheel by, for example, thrusting a pressing member by the electric motor and retaining the thus thrust pressing member by a pressing-member retention mechanism (parking lock mechanism).

Japanese Patent Application Laid-open No. 2010-202159 discloses the following configuration. Specifically, releasing of the parking lock mechanisms is restricted (releasing is inhibited or reengagement is performed) in accordance with the result of determination of whether or not there is an abnormality in the parking lock mechanisms and the result of determination of whether or not the parking lock mechanisms can be released.

In the case of the parking lock mechanism described in Japanese Patent Application Laid-open No. 2010-202159, when an abnormality occurs in any one of the parking lock mechanisms, there is a fear in that the releasing of the parking lock mechanisms may be restricted depending on the abnormality even in the case where all the parking lock mechanisms can be released.

Specifically, for example, the case where there occurs an abnormality that any one of the parking lock mechanisms cannot be engaged when the parking lock mechanisms are to be engaged is considered. In this case, when the parking lock mechanisms are released after the occurrence of the abnormality, there is a fear in that the releasing of the parking lock mechanisms is restricted to restrict the vehicle from running even in the case where all the parking lock mechanisms can be released by releasing the other parking lock mechanisms in which the abnormality does not occur.

SUMMARY OF THE INVENTION

The present invention has been made to solve the problem of the related art described above, and therefore has an object to provide a brake device capable of appropriately releasing a pressing-member retention mechanism when a failure is detected.

In order to solve the above-mentioned problem, according to one embodiment of the present invention, there is provided a brake device, including: at least a pair of brake mechanisms for each thrusting a friction member with use of a pressing member based on an operation of a brake pedal, the friction members being provided so as to be abuttable against rotary members which rotate with at least a pair of wheels of a vehicle; pressing-member retention mechanisms for thrusting the pressing members of the respective brake mechanisms by electric motors to retain the thrust pressing members; and control means for performing switching between allowance and inhibition of control of the electric motors in response to an actuation request signal to store one of a retained state and a released state of the pressing members by the respective pressing-member retention mechanisms and to detect a failure of the pressing-member retention mechanisms. When the pressing-member retention mechanism of at least one of the pair of brake mechanisms is faulty and a state of the pressing-member retention mechanism of the faulty brake mechanism is stored as the released state, the control means achieves a state in which pressing-member release actuation by the electric motor in response to a release actuation request signal to the pressing-member retention mechanism of another brake mechanism of the pair of brake mechanisms is allowed to be controlled. When the state of the pressing-member retention mechanism of the faulty brake mechanism is stored as the retained state, the control means achieves a state in which the control for the pressing-member release actuation of the electric motor in response to the release actuation request signal to the pressing-member retention mechanism of the other brake mechanism of the pair of the brake mechanisms is inhibited.

DETAILED DESCRIPTION OF THE INVENTION

Hereinafter, a brake device according to an embodiment of the present invention is described in detail referring to the accompanying drawings, taking a case where the brake device is mounted in a four-wheeled automobile as an example.

Figure 1:
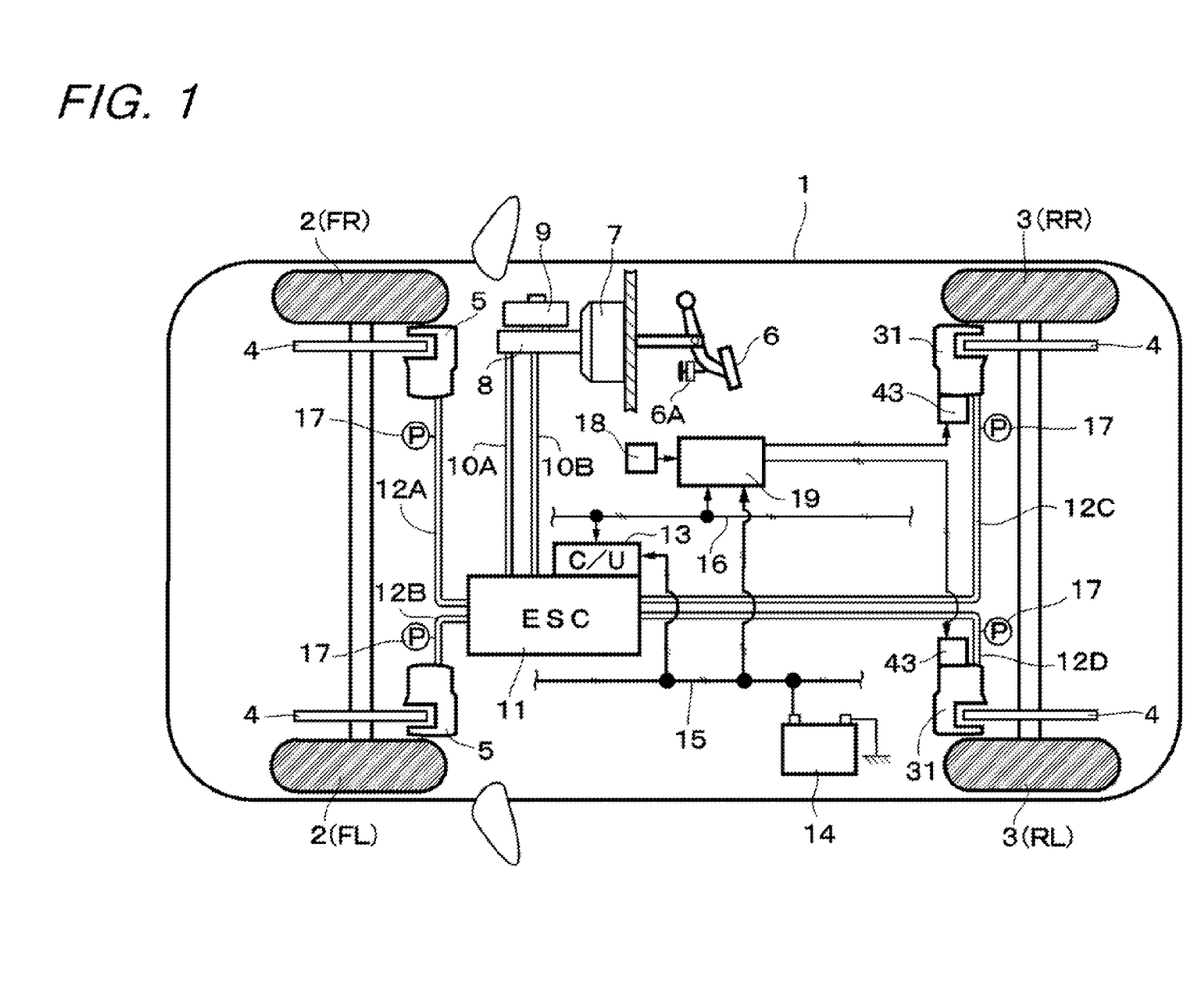
FIG. 1 is a conceptual view illustrating a vehicle in which a brake device according to an embodiment of the present invention is mounted.

As illustrated in FIG. 1, four wheels, for example, right and left front wheels 2 (FR and FL) and right and left rear wheels 3 (RR and RL) are provided to a lower side (road-surface side) of a vehicle body 1 which serves as a body of a vehicle. A disc rotor 4 as a rotary member which rotates with a corresponding one of the wheels (front wheels 2 and rear wheels 3) is provided to each of the front wheels 2 and the rear wheels 3. Specifically, for each of the front wheels 2, the disc rotor 4 is held by a hydraulic disc brake 5 in a sandwiched manner. For each of the rear wheels 3, the disc rotor 4 is held by a hydraulic disc brake 31 having an electric parking brake function described later in a sandwiched manner. In this manner, a braking force is applied to each of the wheels (front wheels 2 and rear wheels 3).

A brake pedal 6 is provided on a front-board side of the vehicle body 1. A depressing operation on the brake pedal 6 is performed by a driver when a braking operation for the vehicle is to be performed. A pedal switch 6A is provided to the brake pedal 6. The pedal switch 6A detects the depressing operation of the brake pedal 6, and outputs a detection signal of the depressing operation to a control unit 13 described later.

The depressing operation on the brake pedal 6 is transmitted to a master cylinder 8 via a booster 7. The booster 7 is a negative-pressure booster or an electric booster, which is provided between the brake pedal 6 and the master cylinder 8. The booster 7 boosts a pedaling force when the depressing operation on the brake pedal 6 is performed, and then transfers the boosted depressing force to the master cylinder 8. At this time, the master cylinder 8 generates a hydraulic pressure by a brake fluid supplied from a master reservoir 9. The master reservoir 9 is a working-fluid tank in which the brake fluid is stored. A mechanism for generating the hydraulic pressure by the brake pedal 6 is not limited to the above-mentioned mechanism, and may also be a mechanism of generating the hydraulic pressure in accordance with the operation of the brake pedal 6, such as a brake-by-wire mechanism.

The hydraulic pressure generated in the master cylinder 8 is transferred to a hydraulic-pressure supply device 11 (hereinafter referred to as "ESC 11") through, for example, a pair of cylinder-side hydraulic-pressure pipes 10A and 10B. The ESC 11 distributes and supplies the hydraulic pressure transferred from the master cylinder 8 to the respective disc brakes 5 and 31 through brake-side pipe portions 12A, 12B, 12C, and 12D. As a result, the braking force is applied to each of the wheels (front wheels 2 and rear wheels 3) as described above.

The ESC 11 includes the controller 13 for the hydraulic-pressure supply device (hereinafter referred to as "control unit 13"), which controls the actuation of the ESC 11. The control unit 13 controls the driving of the ESC 11 to boost, reduce, or maintain the brake fluid pressure to be supplied to each of the disc brakes 5 and 31 from the brake-side pipe portions 12A to 12D. In this manner, brake control such as boost control, braking-force distribution control, brake assist control, antiskid control, traction control, vehicle stabilization control including sideslip, and hill start assist control is executed.

The control unit 13 is a microcomputer or the like. Electric power from a battery 14 is fed to the control unit 13 through a power-supply line 15. As illustrated in FIG. 1, the control unit 13 is connected to a vehicle data bus 16 or the like. In place of the ESC 11, an ABS unit according to a known technology may be used. Further alternatively, the master cylinder 8 may be directly connected to the brake-side pipe portions 12A to 12D without providing (with the omission of) the ESC 11.

The vehicle data bus 16 is configured to include a CAN as a serial communication unit mounted in the vehicle body 1. The vehicle data bus 16 performs on-vehicle multiplex communication to/from a plurality of electronic apparatus mounted in the vehicle, the control unit 13, a parking brake control device 19 described later, and the like. In this case, as vehicle information to be transmitted to the vehicle data bus 16, for example, information such as detection signals from a steering-angle sensor, an accelerator sensor, a brake sensor, a wheel-speed sensor, a vehicle-speed sensor, an inclination sensor, a stereo camera, a millimeter-wave radar, and a seat-belt sensor; transmission data (none of them shown); and detection signals (information) from pressure sensors 17 and the like are given.

The pressure sensors 17 are respectively provided to the brake-side pipe portions 12A, 12B, 12C, and 12D. Each of the pressure sensors 17 individually detects a corresponding in-pipe pressure (hydraulic pressure), in other words, a hydraulic pressure P in a caliper 23 (cylinder portion 36) described later, which corresponds to the in-pipe pressure. The number of the pressure sensors 17 to be provided may be one or two. For example, the pressure sensors 17 may be provided only to the cylinder-side hydraulic-pressure pipes 10A and 10B between the master cylinder 8 and the ESC 11.

In the vehicle body 1, a parking brake switch 18 is provided so as to be located in the vicinity of a driver's seat (not shown). The parking brake switch 18 is operated by the driver. When the parking brake switch 18 is operated to a braking side (parking brake ON side), electric power is fed from the parking brake control device 19 described later to the disc brakes 31 on the side of the rear wheels 3 so as to rotate electric actuators 43 described later to the braking side. In this manner, the disc brakes 31 on the side of the rear wheels 3 actuate as parking brakes. On the other hand, when the actuation as the parking brakes is to be released, the parking brake switch 18 is operated to a brake release side (parking brake OFF side). With the operation of the parking brake switch 18, electric power for reversely rotating the electric actuators 43 is fed to the disc brakes 31. In this manner, the actuation of the disc brakes 31 on the side of the rear wheels 3 as the parking brakes is released.

The parking brakes may be actuated (automatically) based on an actuation determination logic for the parking brakes in the parking brake control device 19, for example, when a state in which a vehicle speed is 0 km/h lasts for a predetermined period of time, when an engine is stopped (is stalled), when a shift lever is operated to a P (parking) position, or the like. The parking brakes may be released (automatically) based on a release determination logic for the parking brakes in the parking brake control device 19 based on an operation of an accelerator or the like. In the case of this embodiment, an actuation request signal serving as a signal for actuating the parking brakes and an actuation release request signal serving as a signal for releasing the parking brakes contain not only a signal output from the parking brake switch 18 but also an actuation command and a release command based on the above-mentioned actuation determination logic and release determination logic for the parking brakes.

The parking brake control device 19 is a microcomputer or the like. Electric power from the battery 14 is fed to the parking brake control device 19 through the power-supply line 15. The parking brake control device 19 serves as control means (controller or control unit) which is a constituent element of the present invention. The parking brake control device 19 controls the driving of the disc brakes 31 (that is, the electric actuators 43) described later to generate a braking force when the vehicle is to be parked, stopped, or the like.

When the driver of the vehicle operates the parking brake switch 18, the parking brake control device 19 drives the electric actuators 43 described later based on a signal (ON/OFF signal) output from the parking brake switch 18 so that the disc brakes 31 are actuated (applied) or released as parking brakes. Based on the actuation determination logic and the release determination logic for the parking brakes in addition to the signal from the parking brake switch 18, the parking brake control device 19 drives the electric actuators 43 to actuate or release the disc brakes 31.

Figure 2:
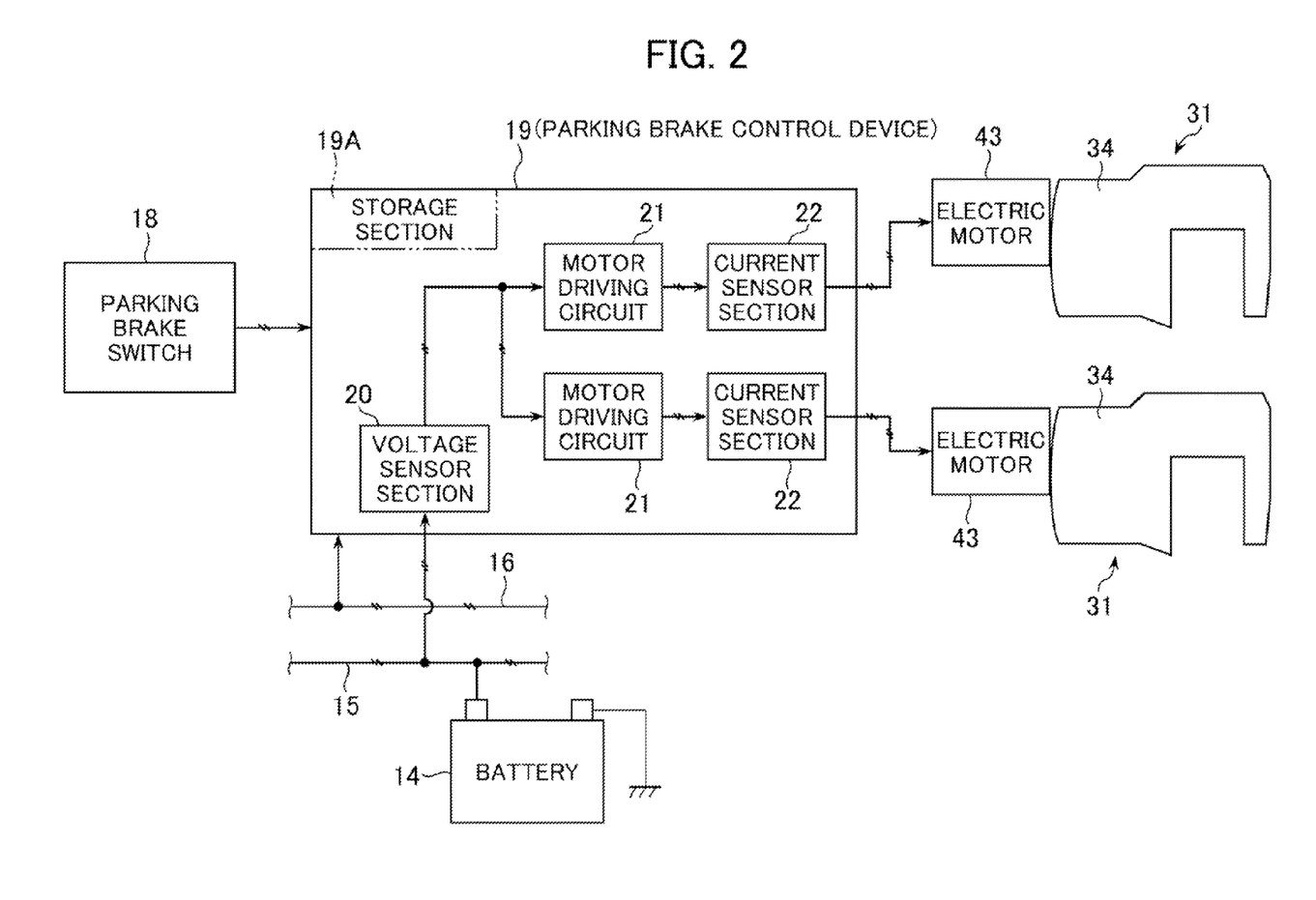
FIG. 2 is a block diagram illustrating a parking brake control device illustrated in FIG. 1.
Figure 3:
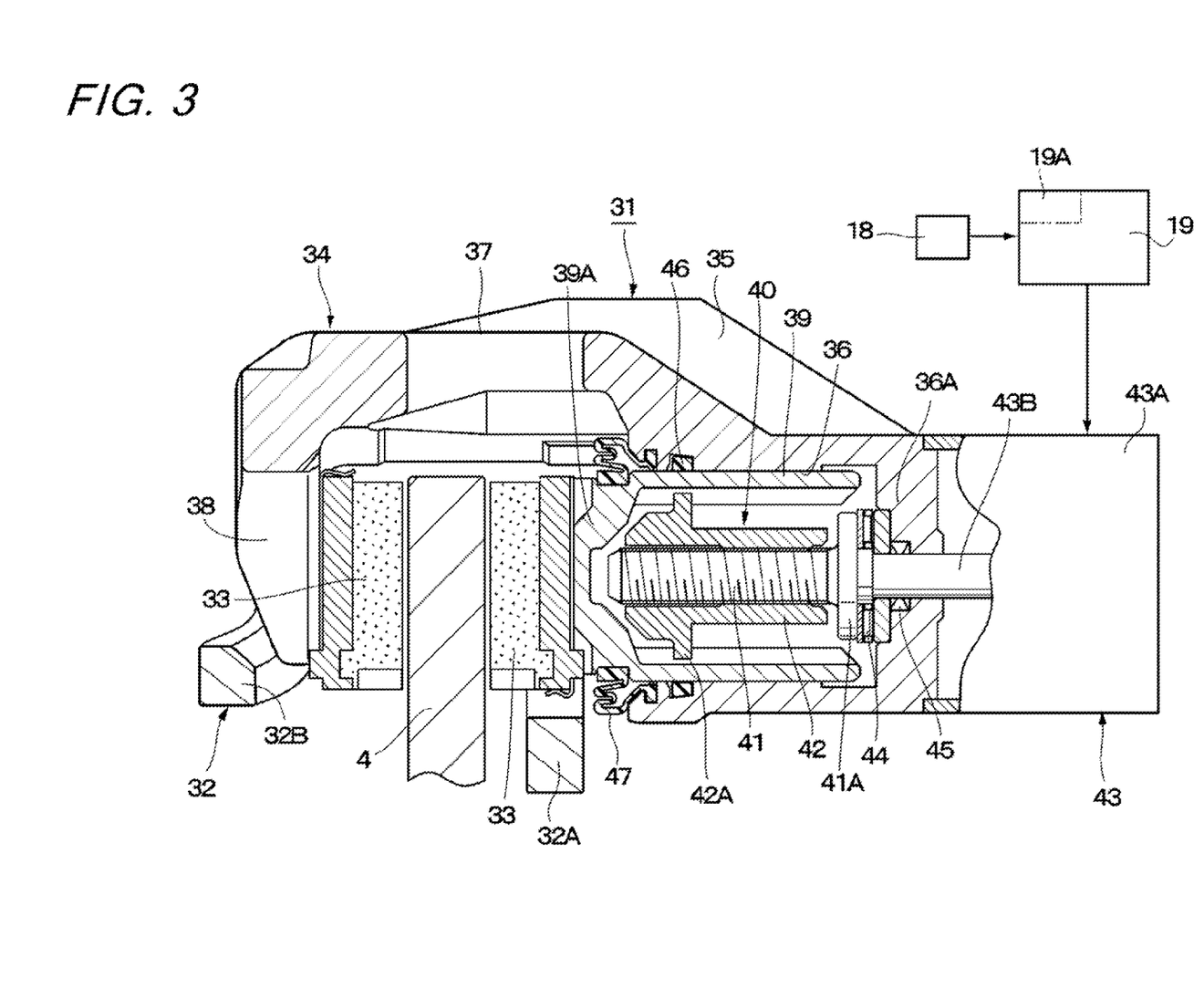
FIG. 3 is a longitudinal sectional view illustrating a disc brake having an electric parking brake function, which is provided to a rear-wheel side illustrated in FIG. 1, in an enlarged manner.

As illustrated in FIGS. 1 to 3, an input side of the parking brake control device 19 is connected to the parking brake switch 18, whereas an output side thereof is connected to the electric actuators 43 for the disc brakes 31. The input side and output side of the parking brake control device 19 are connected to the control unit 13 of the ESC 11 through the vehicle data bus 16. Various state quantities of the vehicle, which are required for actuation and release of the parking brakes, that is, various vehicle information described above can be acquired through the vehicle data bus 16. The vehicle information acquired through the vehicle data bus 16 may be acquired by directly connecting a sensor for detecting the vehicle information to the parking brake control device 19.

The parking brake control device 19 includes a storage section (memory) 19A (see FIGS. 2 and 3), for example, a flash memory, a ROM, a RAM, or an EEPROM. The storage section 19A stores programs of the above-mentioned actuation determination logic and release determination logic for the parking brakes, a processing program illustrated in FIG. 4, which is described later, that is, a processing program for determining whether or not the electric motors (electric actuators 43) can be controlled and for performing switching between allowance and inhibition of control in accordance with the determination to engage the disc brakes 31 (brake application) or release the disc brakes 31 (brake release).

Further, in the storage section 19A of the parking brake control device 19, a status (retained state, released state, or unknown state) of a pressing member (piston 39), which is achieved by a pressing-member retention mechanism (rotation-linear motion conversion mechanism 40) described below is stored each time the status is changed. Specifically, in the parking brake control device 19, when the retention of the piston 39 by the rotation-linear motion conversion mechanism 40 is completed, a retention flag is set. When the release of the piston 39 is completed, a release flag is set. In the storage section 19A, the status of the piston 39, which is achieved by the rotation-linear motion conversion mechanism 40, is stored as a "retained state (engaged state)" when the retention flag is set and is stored as a "released state" when the release flag is set.

Moreover, when the status of the piston 39 can be specified neither as the "retained state" nor the "released state" as in the case where, for example, the driving of the electric actuator 43 is terminated between the start of the driving of the electric actuator 43 and the setting of the retention flag or the release flag, the status of the piston 39 is stored as the "unknown state" in the storage section 19A. The status of the rotation-linear motion conversion mechanism 40 (status of the piston 39), which is stored in the storage section 19A, is stored in a non-volatile storage device (memory) which can maintain the storage even without power supply, for example, in an EEPROM so that the status can be immediately used even when a system is restarted after the power supply to the parking brake control device 19 is interrupted (after system stop or system shutdown). Although the parking brake control device 19 is provided independently of the control unit 13 for the ESC 11 in this embodiment, the parking brake control device 19 may be configured integrally with the control unit 13. Moreover, although the parking brake control device 19 controls the two, that is, right and left disc brakes 31, the parking brake control device 19 may be provided to each of the right and left disc brakes 31. In this case, the parking brake control device 19 may be provided integrally with each of the disc brakes 31.

As illustrated in FIG. 2, the parking brake control device 19 includes therein a voltage sensor section 20, a right motor driving circuit 21, a left motor driving circuit 21, a right current sensor section 22, and a left current sensor section 22. The voltage sensor section 20 detects a voltage VB from the power-supply line 15. The right and left motor driving circuits 21 respectively drive the right and left electric actuators 43. The right current sensor section 22 detects a motor current $IM_R$ of the right electric actuator 43, whereas the left current sensor section 22 detects a motor current $IM_L$ of the left electric actuator 43. With the configuration described above, the parking brake control device 19 can determine a failure of any one of the disc brakes 31, more specifically, a failure of any one of the pressing-member retention mechanisms (rotation-linear motion conversion mechanisms 40) in accordance with, for example, the voltage VB from the power-supply line 15 (voltage VB input to the parking brake control device 19) and the motor currents $IM_R$ and $IM_L$ of the right and left electric actuators 43. In this case, the parking brake control device 19 can detect whether or not a failure has occurred in any one of the right and left disc brakes 31, whether or not the failure is a physical failure, and whether or not the failure can be controlled, based on, for example, a difference between the motor currents $IM_R$ and $IM_L$, and a fluctuation of the difference.

The parking brake control device 19 can determine that the vehicle is running normally (can make normal running determination) by using the vehicle information acquired through the vehicle data bus 16. For example, when there is not a large difference between the wheel-speed information of the four wheels, that is, the front right and left wheels 2 and the rear right and left wheels 3, it can be determined that the vehicle is running normally. In this case, the right and left disc brakes 31 are placed in the released state (in a state in which the actuation of the parking brakes is released).

The case where, for example, the disc brake 31 for the rear left wheel 3 is brought into the engaged state (state in which the parking brake is actuated) while the vehicle is running is now considered. In this case, the rear left wheel 3 is in an unmovable state, or a hardly movable state. Therefore, there arises a large difference between the wheel-speed information of the rear left wheel 3 and the wheel-speed information of the remaining three wheels 2 and 3. Thus, it is not determined that the vehicle is running normally. On the other hand, for example, when it is determined that any one of the right and left disc brakes 31 is in the engaged state even though it can be determined that the vehicle is running normally because there is not a large difference between the wheel-speed information of the front right and left wheels 2 and the rear right and left wheels 3, the determination of the engaged state is regarded as an erroneous determination. Thus, it can be determined that the right and left disc brakes 31 are in the released state.

In order to avoid an erroneous determination of whether or not the vehicle is running normally when there is generated a difference between the wheel-speed information due to a wheelspin, for example, accelerator opening-degree information can be used in addition to the wheel-speed information as the vehicle information. In general, the wheelspin is likely to occur when an accelerator opening degree is large. Therefore, when the accelerator opening degree is small and there is not a large difference between the wheel-speed information, it may be determined that the vehicle is running normally. Moreover, in order to improve reliability of the determination of whether or not the vehicle is running normally, vehicle information other than the wheel-speed information and the accelerator opening-degree information may be added as needed.

In this embodiment, when detecting a failure of any one of the right and left disc brakes 31 (more specifically, a failure of any one of the rotation-linear motion conversion mechanism 40), the parking brake control device 19 can perform switching between allowance and inhibition of control of the electric actuator 43 in accordance with the state of the faulty disc brake 31 (state of the corresponding piston 39). Specifically, when detecting the occurrence of the failure, the parking brake control device 19 reads out the state of the faulty disc brake 31, that is, any one of the "retained state (engaged state)", the "released state", and the "unknown state" from the storage section 19A. Then, in accordance with the result of readout, the parking brake control device 19 determines to allow or inhibit the control of the electric motor (electric actuator 43), that is, performs switching between the state in which the actuation of the electric motor (electric actuator 43) can be controlled and the state in which the actuation of the electric motor cannot be controlled, in response to the actuation request signal (actuation request command) from the parking brake switch 18 or the actuation request signal (actuation request command) based on the above-mentioned actuation determination logic or release determination logic for the parking brakes.

Specifically, when the state of the rotation-linear motion conversion mechanism 40 of the faulty disc brake 31 is stored as the "released state" in the storage section 19A, control for pressing-member release actuation of the electric actuator 43, which is performed in response to the release actuation request signal for the rotation-linear motion conversion mechanism 40 of the other disc brake 31 which is not faulty, is allowed, that is, the state in which the control can be performed is achieved. On the other hand, when the state of the rotation-linear motion conversion mechanism 40 of the faulty disc brake 31 is stored as the "retained state (engaged state)" in the storage section 19A, the control for the pressing-member release actuation of the electric actuator 43, which is performed in response to the release actuation request signal for the rotation-linear motion conversion mechanism 40 of the other disc brake 31 which is not faulty, is inhibited, that is, the state in which the control cannot be performed is achieved.

Further, when the state of the rotation-linear motion conversion mechanism 40 of the faulty disc brake 31 is stored as the "unknown state" in the storage section 19A, the control for the pressing-member release actuation of the electric actuator 43, which is performed in response to the release actuation request signal for the rotation-linear motion conversion mechanism 40 of the other disc brake 31 which is not faulty, is inhibited, that is, the state in which the control cannot be performed is achieved. Processing of the determination for allowing or inhibiting the control of the electric actuator 43 described above, that is, for the switching between the state in which the control can be performed and the state in which the control cannot be performed is described later in detail.

Next, a configuration of the disc brakes 31 having an electric parking brake function, which are provided on the side of the rear right and left wheels 3, is described referring to FIG. 3. In FIG. 3, only one of the right and left disc brakes 31 which are provided corresponding to the rear right and left wheels 3 is illustrated.

Each of the pair of disc brakes 31 respectively provided on the right and the left of the vehicle is configured as a hydraulic disc brake having an electric parking brake function. Each of the disc brakes 31 includes a mounted member 32, an inner-side brake pad 33, an outer-side brake pad 33, and a caliper 34. The mounted member 32 is mounted to a non-rotary portion of the vehicle on the side of the rear wheels 3. The inner-side brake pad 33 and the outer-side brake pad 33 are provided as friction members. The caliper 34 is provided as a brake mechanism provided with the electric actuator 43, which is described later.

The mounted member 32 includes a pair of arm portions (not shown) and a bearing portion 32A having a large thickness. The pair of arm portions extends in an axial direction of a disc rotor 4 (that is, a disc axis direction) so as to pass over an outer circumference of the disc rotor 4. The arm portions are separated away from each other in a disc circumferential direction. The bearing portion 32A is provided so as to couple integrally base end sides of the respective arm portions, and is fixed to a non-rotary portion of the vehicle at a position on the inner side of the disc rotor 4. A reinforcing beam 32B for coupling distal end sides of the respective arm portions is formed integrally with the mounted member 32 at a position on the outer side of the disc rotor 4.

With the above-mentioned configuration, the arm portions of the mounted member 32 are coupled integrally by the bearing portion 32A on the inner side of the disc rotor 4 and are coupled integrally by the reinforcing beam 32B on the outer side. The inner-side brake pad 33 and the outer-side brake pad 33 serve as the friction members. The inner-side brake pad 33 and the outer-side brake pad 33 are provided so as to be brought into abutment against both surfaces of the disc rotor 4, and are supported movably in the disc axis direction by the arm portions of the mounted member 32. The inner-side brake pad 33 and the outer-side brake pad 33 are pressed against the two surfaces of the disc rotor 4 by the caliper 34 (caliper main body 35 and piston 39).

The caliper 34 is provided to the mounted member 32 so as to pass over the outer circumferential side of the disc rotor 4. The caliper 34 mainly includes the caliper main body 35 and the piston 39. The caliper main body 35 is supported movably along the axial direction of the disc rotor 4 with respect to the respective arm portions of the mounted member 32. The piston 39 is provided inside the caliper main body 35. The rotation-linear motion conversion mechanism 40 and the electric actuator 43 described later are provided to the caliper 34. The caliper 34 serves as the brake mechanism for thrusting the brake pads 33 by the piston 39 based on the operation of the brake pedal 6.

The caliper main body 35 includes a cylinder portion 36, a bridge portion 39, and a claw portion 38. The cylinder portion 36 is formed to have a cylindrical shape with a closed end. Specifically, one axial end of the cylinder portion 36 is closed by a partition-wall portion 36A, whereas the other axial end opposed to the disc rotor 4 is an open end. The bridge portion 37 is formed to extend from the cylinder portion 36 in the disc axis direction so as to pass over the outer circumferential side of the disc rotor 4. The claw portion 38 is provided so as to extend to the side opposite to the cylinder portion 36 through the bridge portion 37 therebetween. The cylinder portion 36 of the caliper main body 35 serves as an inner leg portion provided on one side (inner side) of the disc rotor 4, whereas the claw portion 38 serves as an outer leg portion provided on the other side (outer side) of the disc rotor 4.

The hydraulic pressure generated with the depressing operation on the brake pedal 6 is supplied to the cylinder portion 36 of the caliper main body 35 through the brake-side pipe portion 12C or 12D illustrated in FIG. 1. The partition-wall portion 36A is formed integrally with the cylinder portion 36 so as to be located between the cylinder portion 36 and the electric actuator 43 described later. On the inner circumference side of the partition-wall portion 36A, an output shaft 43B of the electric actuator 43 is inserted so as to be rotatable. Inside the cylinder portion 36 of the caliper main body 35, the piston 39 as a pressing member and the rotation-linear motion conversion mechanism 40 described later are provided. Although the rotation-linear motion conversion mechanism 40 is configured to be housed within the piston 39 in this embodiment, the rotation-linear motion conversion mechanism 40 is not necessarily required to be housed within the piston 39 as long as the piston 39 is thrust by the rotation-linear motion conversion mechanism 40.

One axial end of the piston 39, which is located on the opening side, is inserted into the cylinder portion 36, whereas the other axial end thereof, which faces the inner-side brake pad 33, is closed to become a lid portion 39A. Inside the cylinder portion 36, the rotation-linear motion conversion mechanism 40 is housed within the piston 39. The piston 39 is thrust by the rotation-linear motion conversion mechanism 40 in the axial direction of the cylinder portion 36. The rotation-linear motion conversion mechanism 40 serves as a pressing-member retention mechanism which is a constituent element of the present invention. Independently of the application of the hydraulic pressure to the interior of the cylinder portion 36, the rotation-linear motion conversion mechanism thrusts the piston 39 of the caliper 34 by an external force, that is, by the electric actuator 43 and retains the thus thrust piston 39. The right and left disc brakes 31 are provided so as to correspond to the rear right and left wheels 3. Therefore, the rotation-linear motion conversion mechanism 40 and the electric actuator 43 are provided on each of the right and left of the vehicle.

The rotation-linear motion conversion mechanism 40 includes a screw member 41 and a linear-motion member 42. The screw member 41 has a bar-like body on which a male thread such as a trapezoidal thread is formed. The linear-motion member 42 which serves as a thrust member having an inner circumferential side on which a female threaded hole formed of a trapezoidal thread is formed. Specifically, the screw member 41 threadably fitted into the inner circumferential side of the linear-motion member 42 serves as a screw mechanism for converting rotational movement caused by the electric actuator 43 described later into linear movement of the linear-motion member 42. In this case, the female thread of the linear-motion member 42 and the male thread of the screw member 41 serve as the pressing-member retention mechanism by forming the female thread and the male thread by using threads with large irreversibility, that is, the trapezoidal threads in this embodiment. The pressing-member retention mechanism (rotation-linear motion conversion mechanism 40) can retain the linear-motion member 42 (that is, the piston 39) in an arbitrary position with a friction force (retention force) even in a state in which power feeding to the electric actuator 42 is stopped. In this manner, energy can be saved. Any configuration may be used as the pressing-member retention mechanism as long as the piston 39 can be retained in a position to which the piston 39 is thrust by the electric actuator 43. Therefore, for example, a screw having large irreversibility other than the trapezoidal thread may be used.

The screw member 41, which is provided so as to be threadably fitted on the inner circumferential side of the linear-motion member 42, is provided with a flange portion 41A having a large diameter on one axial end thereof. The other axial end side of the screw member 41 extends toward the lid portion 39A of the piston 39. The screw member 41 is coupled to the output shaft 43B of the electric actuator 43 described later on the flange portion 41A side so as to be integral therewith. On the outer circumferential side of the linear-motion member 42, an engaging projecting portion 42A for stopping rotation of the linear-motion member 42 (restricting relative rotation) with respect to the piston 39 and allowing axial movement of the linear-motion member 42 relative to the piston 39 is provided.

The electric actuator 43 as the electric motor (actuator for the parking brake) is provided inside a casing 43A. The casing 43A is fixedly provided to the cylinder portion 36 of the caliper main body 35 at a position on the outer side of the partition-wall portion 36A. The electric actuator 43 includes a motor according to a known technology, which includes a stator and a rotor therein, and a speed reducer for amplifying a torque of the motor (none of them shown). The speed reducer includes the output shaft 43B for outputting a rotary torque after the amplification. The output shaft 43B extends in the axial direction so as to pass through the partition-wall portion 36A of the cylinder portion 36, and is coupled to the screw member 41 so as to rotate integrally with the flange portion 41A side of the screw member 41 inside the cylinder portion 36.

Means for coupling the output shaft 43B and the screw member 41 may be configured, for example, so that the output shaft 431 and the screw member 41 are movable in the axial direction but are retained in a direction of rotation. In this case, for example, a known technology such as spline fitting or fitting using a polygonal column (non-circular fitting) may be used. As the speed reducer, for example, a planetary-gear speed reducer or a worm-gear speed reducer may be used. When a known speed reducer without reversibility in operation (with irreversibility) such as the worm-gear speed reducer, a known mechanism having reversibility, such as a ball screw or a ball ramp mechanism may be used as the rotation-linear motion conversion mechanism 40. In this case, the pressing-member retention mechanism can be configured with, for example, a reversible rotation-linear motion conversion mechanism and an irreversible speed reducer.

When the driver operates the parking brake switch 18 illustrated in FIGS. 1 to 3, power is fed from the parking brake control device 19 to (the motor of) the electric actuator 43 to rotate the output shaft 43B of the electric actuator 43. Therefore, the screw member 41 of the rotation-linear motion conversion mechanism 40 is rotated integrally with the output shaft 43B, for example, in one direction, and thrusts (drives) the piston 39 toward the disc rotor 4 through an intermediation of the linear-motion member 42. As a result, the disc rotor 4 is sandwiched between the inner-side brake pad 33 and the outer-side brake pad 33 of the disc brake 31 so that the disc brake 31 is actuated (applied) as the electric parking brake.

On the other hand, when the parking brake switch 18 is operated to the braking release side, the screw member 41 of the rotation-linear motion conversion mechanism 40 is rotationally driven in another direction (opposite direction) by the electric actuator 43. As a result, the linear-motion member 42 is driven through an intermediation of the rotation-linear motion conversion mechanism 40 in a retracting direction in which the linear-motion member 42 is separated away from the disc rotor 4. As a result, the actuation of the disc brake 31 is released as the parking brake.

In this case, when the screw member 41 is rotated relative to the linear-motion member 42 in the rotation-linear motion conversion mechanism 40, the linear-motion member 42 moves relatively in the axial direction in accordance with an angle of rotation of the screw member 41 because the rotation of the linear-motion member 42 inside the piston 39 is restricted. As a result, the rotation-linear motion conversion mechanism 40 converts the rotational movement into the linear movement. Then, the piston 39 is thrust by the linear-motion member 42. With the thrust, the rotation-linear motion conversion mechanism 40 retains the linear-motion member 42 in an arbitrary position with the friction force to retain the piston 39 in the position to which the piston 39 is thrust by the electric actuator 43.

A thrust bearing 44 is provided between the partition-wall portion 36A of the cylinder portion 36 and the flange portion 41A of the screw member 41. The thrust bearing 44 bears a thrust load from the screw member 41 together with the partition-wall portion 36A to smoothen the rotation of the screw member 41 relative to the partition-wall portion 36A. A sealing member 45 is provided to the partition-wall portion 36A of the cylinder portion 36 between the partition-wall portion 36A and the output shaft 43B of the electric actuator 43. The sealing member 45 seals between the partition-wall portion 36A and the output shaft 43B so as to prevent the brake fluid in the cylinder potion 36 from leaking to the electric actuator 43 side.

On the open end side of the cylinder portion 36, a piston seal 46 and a dust boot 47 are provided. The piston seal 46 is provided as an elastic seal for sealing between the cylinder portion 36 and the piston 39. The dust boot 47 prevents a foreign substance from entering the interior of the cylinder portion 36. The dust boot 47 is an accordion-like sealing member having flexibility, and is mounted between the open end of the cylinder portion 36 and the outer circumference of the piston 39 on the lid portion 39A side.

Each of the disc brakes 5 provided on the side of the front wheels 2 is configured in substantially the same manner as each of the disc brakes 31 provided on the side of the rear wheels 3 except for the parking brake mechanism. Specifically, each of the disc brakes 5 on the side of the front wheels 2 does not include the rotation-linear motion conversion mechanism 40 and the electric actuator 43 which are included in each of the disc brakes 31 provided on the side of the rear wheels 3 and actuate as the parking brake. Otherwise, however, each of the disc brakes 5 provided on the side of the front wheels 2 is configured in substantially the same manner as that of each of the disc brakes 31. In some cases, the disc brakes 31 having the electric parking brake function may be provided in place of the disc brakes 5 even on the side of the front wheels 2.

In this embodiment, the hydraulic disc brake 31 having the caliper 34 including the electric actuator 43 has been described as an example. However, the disc brake is not limited thereto. For example, any configuration other than the configuration of the embodiment described above may be used as long as a brake mechanism can thrust the friction member by the electric motor (electric actuator). For example, an electric disc brake including an electric caliper, an electric drum brake including an electric drum for applying a braking force by the electric actuator, or a disc brake provided with an electric drum type parking brake may be used.

The brake device of the four-wheeled automobile according to this embodiment has the configuration described above. The actuation of the brake device is now described.

When the driver of the vehicle performs the depressing operation of the brake pedal 6, the pedaling force is transferred to the master cylinder 8 through an intermediation of the booster 7. Then, the brake fluid pressure is generated by the master cylinder 8. The hydraulic pressure generated in the master cylinder 8 is distributed and supplied to the respective disc brakes 5 and 31 through the cylinder-side hydraulic-pressure pipes 10A and 10B, the ESC 11, and the brake-side pipe portions 12A, 12B, 12C, and 12D to apply the braking force to the front right and left wheels 2 and the rear right and left wheels 3.

The operation in this case is described for the disc brakes 31 provided on the side of the rear wheels 3. The hydraulic pressure is supplied through the brake-side pipe portions 12C and 12D into the cylinder portions 36 of the calipers 34. Then, with an increase in the hydraulic pressure in the cylinder portion 36, the piston 39 slides to displace toward the inner-side brake pad 33. As a result, the piston 39 presses the inner-side brake pad 33 against one side surface of the disc rotor 4. By a reaction force generated at this time, the entire caliper 34 slides to displace toward the inner side of the disc rotor 4 with respect to the arm portions of the mounted member 32.

As a result, the outer leg portion (claw portion 38) of the caliper 34 operates so as to press the outer-side brake pad 33 against the disc rotor 4. The disc rotor 4 is sandwiched between the pair of brake pads 33 on both sides in the axial direction. As a result, the braking force in accordance with the application of the hydraulic pressure is generated. On the other hand, when the brake operation is released, the supply of the hydraulic pressure into the cylinder portion 36 is cancelled and stopped. As a result, the piston 39 displaces so as to be retracted into the cylinder portion 36. Then, the inner-side brake pad 33 and the outer-side brake pad 33 are separated away from the disc rotor 4. As a result, the vehicle is returned to a non-braked state.

Subsequently, when the driver of the vehicle operates the parking brake switch 18 so as to actuate (apply) the parking brake, power is fed from the parking brake control device 19 to the electric actuator 43 of the disc brake 31 to rotationally drive the output shaft 43B of the electric actuator 43. The disc brake 31 with the electric parking brake function converts the rotation of the electric actuator 43 into the linear movement through an intermediation of the screw member 41 and the linear-motion member 42 of the rotation-linear motion conversion mechanism 40. By moving the linear-motion member 42 in the axial direction to thrust the piston 39, the pair of brake pads 33 is pressed against the two surfaces of the disc rotor 4.

At this time, the linear-motion member 42 is retained in the braking state by the friction force (retention force) generated between the linear-motion member 42 and the screw member 41. As a result, the disc brakes 31 on the side of the rear wheels 3 are actuated as the parking brakes. Specifically, even after the power feeding to the electric actuator 43 is stopped, the linear-motion member 42 (that is, the piston 39) can be retained in the braking state by the female thread of the linear-motion member 42 and the male thread of the screw member 41.

On the other hand, when the driver operates the parking brake switch 18 to the braking release side so as to release the parking brakes, the power is fed from the parking brake control device 19 to the electric actuator 43 so as to rotate the motor in a reverse rotation direction. The output shaft 43B of the electric actuator 43 is rotated in the direction opposite to the direction of rotation when the parking brakes are actuated. At this time, the retention of the braking force by the screw member 41 and the linear-motion member 42 is released in the rotation-linear motion conversion mechanism 40. At the same time, the linear-motion member 42 is moved in the return direction into the cylinder portion 36 by a movement amount corresponding to the reverse rotation of the electric actuator 43, thereby releasing the braking force of the parking brake (disc brake 31).

When a failure occurs in one of the disc brakes 31 having the electric parking brake function, which are provided on the right and left of the vehicle, for example, when a failure occurs in the rotation-linear motion conversion mechanism 40 of one of the disc brakes 31 and the faulty disc brake 31 is in the engaged state (state in which the parking brake is actuated), it is not preferred to allow the driving of the electric actuator 43 of the other disc brake 31 which is not faulty. The reason is as follows. If the other non-faulty disc brake 31 is brought into the released state, there is a fear in that the vehicle runs while the one of the disc brakes 31 remains in the engaged state, that is, while one of the right and left disc brakes 31 remains in the engaged state.

On the other hand, when the faulty disc brake 31 is in the released state, the driving of the electric actuator 43 of the other non-faulty disc brake 31 is allowed to bring the non-faulty disc brake 31 into the released state. As a result, the vehicle can run in a state in which both the right and left disc brakes 31 are in the released state.

Therefore, in this embodiment, the parking brake control device 19 is configured to determine whether or not the electric actuator 43 can be controlled (whether or not the control for actuating or releasing the parking brake can be performed) in response to the actuation request signal (actuation request command) based on the signal from the parking brake switch 18 or the above-mentioned actuation or release determination logic for the parking brakes in accordance with the state of the faulty disc brake 31. Hereinafter, control processing is described referring to FIG. 4. In the following description, the application of the parking brake, that is, an operation of driving the electric actuator 43 to thrust the piston 39 by the rotation-linear motion conversion mechanism 40 and to retain the thrust piston 39 is referred as "engagement", and an operation of releasing the retention is referred to as "release". The processing illustrated in FIG. 4 is repeatedly executed at predetermined time intervals while the parking brake control device 19 is energized.

Figure 4:
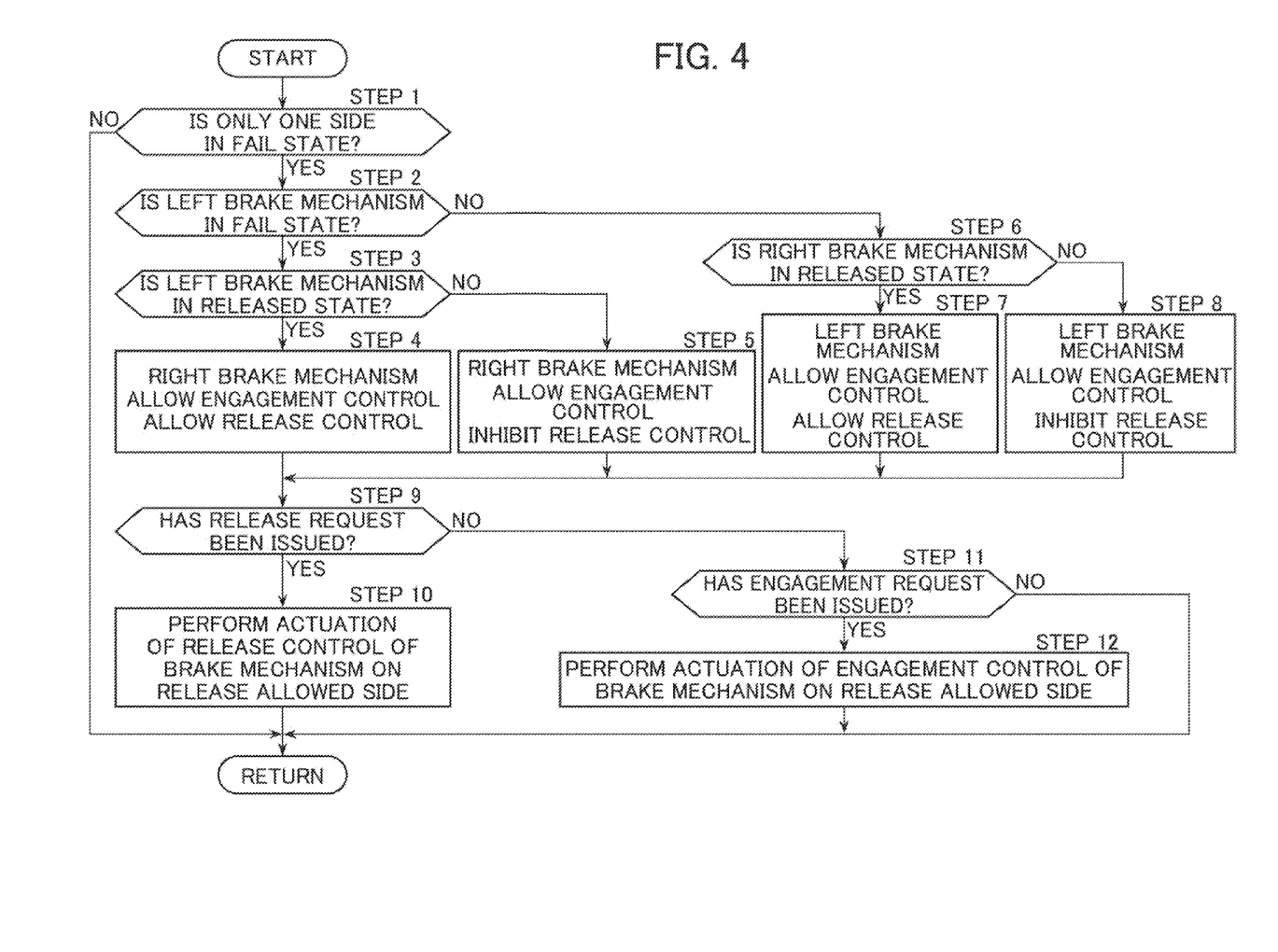
FIG. 4 is a flowchart illustrating control processing performed by the parking brake control device illustrated in FIG. 1.

After an processing operation illustrated in FIG. 4 is started, it is determined in Step 1 whether or not any one (one) of the right and left disc brakes 31 is faulty (occurrence of a failure is hereinafter referred to as "fail state" in the description referring to FIG. 4). For example, whether or not the rotation-linear motion conversion mechanism 40 of any one of the right and left disc brakes 31 is faulty is determined based on, for example, the difference between the motor currents $IM_R$ and $IM_L$ of the right and left electric actuators 43 and the fluctuation of the difference. In Step S1, when the result of determination is "NO", that is, both (the rotation linear-motion conversion mechanisms 40 of) the disc brakes 31 are normal, or both the disc brakes 31 are in the fail state, the processing proceeds to "return". In this case, when both the disc brakes 31 are normal, the processing returns to "start" to repeat the processing starting in Step 1. On the other hand, when both the disc brakes 31 are in the fail state, another processing (not shown) in accordance with the fail state, for example, inhibition of the driving of the electric actuators 43 of both the disc brakes 31, is performed.

On the other hand, in Step 1, when the result of determination is "YES", that is, it is determined that one of (the rotation-linear motion conversion mechanisms 40 of) the right and left disc brakes 31 is in the fail state, the processing proceeds to Step 2 where which one of (the rotation-linear motion conversion mechanisms 40 of) the disc brakes 31 provided to the vehicle is in the fail state is specified. Specifically, in Step 2, whether or not the disc brake 31 on the left side of the vehicle is in the fail state is determined. In Step 2, when the result of determination is "YES", that is, it is determined that the left disc brake 31 is in the fail state, the processing proceeds to Step 3 where it is determined whether or not the left disc brake 31 in the fail state is in the "released state". The determination of whether or not the left disc brake 31 is in the "released state" is made in accordance with the state of the left disc brake 31, which is stored in the storage section 19A, that is, any one of the "engaged state (retained state)", "released state", and "unknown state" which is stored in accordance with the retention flag or the release flag described above.

In Step 3, when the result of determination is "YES", that is, it is determined that the left disc brake 31 in the fail state is in the "released state", the processing proceeds to Step 4 where the setting is performed for the right disc brake 31 which is not in the fail state so that engagement control and release control are both allowed. On the other hand, when the result of determination is "NO" in Step 3, that is, it is determined that the left disc brake 31 in the fail state is not in the "released state" (is in the "engaged state" or the "unknown state"), the processing proceeds to Step 5 where the setting is performed for the right disc brake 31 which is not in the fail state so that the engagement control is allowed but the release control is inhibited.

On the other hand, when the result of determination is "NO", that is, it is determined that the left disc brake 31 is not in the fail state (the right disc brake 31 is in the fail state) in Step 2, the processing proceeds to Step 6 where it is determined whether or not the right disc brake 31 in the fail state is in the "released state". The determination of the whether or not the right disc brake 31 is in the "released state" is made in accordance with the state of the right disc brake 31, which is stored in the storage section 19A, that is, any one of the "engaged state (retained state)", "released state", and "unknown state" which is stored in accordance with the retention flag or the release flag described above.

In Step 6, when the result of determination is "YES", that is, it is determined that the right disc brake 31 in the fail state is in the released state, the processing proceeds to Step 7 where the setting is performed for the left disc brake 31 which is not in the fail state so that the engagement control and the release control are both allowed. On the other hand, when the result of determination is "NO", that is, it is determined that the right disc brake 31 in the fail state is not in the released state (in the "engaged state" or the "unknown state") in Step 6, the processing proceeds to Step 8 where the setting is performed for the left disc brake 31 which is not in the fail state so that the engagement control is allowed but the release control is inhibited.

When the allowance and inhibition of the engagement control and the release control by the disc brake 31 which is not in the fail state are set, that is, the switching for the allowance or the inhibition of the control is performed in any one of Steps 4, 5, 7, and 8, the processing proceeds to Step 9. In Step 9, it is determined whether or not the release request (actuation release request signal) based on the signal from the parking brake switch 18 or the actuation or release determination logic for the parking brakes described above has been issued. When the result of determination is "YES", that is, the release request (actuation release request signal) has been issued in Step 9, the processing proceeds to Step 10 where the release control is performed for the disc brake 31 which is not in the fail state in the case where the release control is allowed in Step 4 or 7 before this Step 10.

Specifically, the electric actuator 43 of the disc brake 31 which is not in the fail state is driven to the release side in accordance with the release request (actuation release request signal) based on the signal from the parking brake switch 18 or the actuation or release determination logic for the parking brake described above. In this manner, the disc brake 31 which is not in the fail state is released. In this case, both the right and left disc brakes 31, any one of which is in the fail state, are brought into the released state. As a result, the vehicle can run in a state in which both the right and left disc brakes 31 are released.

On the other hand, in the case where the release control is inhibited in Step 5 or 8 before this Step 10, the release control is not performed for the disc brake 31 which is not in the fail state. Specifically, even if the release request (actuation release request signal) has been issued based on the signal from the parking brake switch 18 or the actuation or release determination logic for the parking brake described above, the electric actuator 43 of the disc brake 31 which is not in the fail state is not driven to the release side (is held in the engaged state).

In Step 9, when the result of determination is "NO", that is, it is determined that the release request (actuation release request signal) has not been issued, the processing proceeds to Step 11 where whether or not an engagement request (actuation request signal) has been issued is determined based on the signal from the parking brake switch 18 or the actuation or release determination logic of for the parking brake described above. In Step 11, when the result of determination is "YES", that is, it is determined that the engagement request (actuation request signal) has been issued, the processing proceeds to Step 12 where the engagement control for the disc brake 31 which is not in the fail state is performed. Specifically, the electric actuator 43 of the disc brake 31 which is not in the fail state is driven to the engagement side in accordance with the engagement request (actuation request signal) based on the signal from the parking brake switch 18 or the actuation or release determination logic for the parking brake described above. In this manner, the disc brake 31 which is not in the fail state is engaged.

On the other hand, in Step 11, when the result of determination is "NO", that is, it is determined that the engagement request (actuation request signal) has not been issued, the processing returns to "start" through "return". Then, the processing after Step 1 is repeated. The relationship of the control processing performed by the control processing illustrated in FIG. 4, that is, the relationship between the allowance and inhibition of the release control and the engagement control by the disc brake 31 in the fail state and the electric actuator 43 thereof is shown in Table 1 below.

and the intermediate processing. In Table 1, the field "non-actuated" for "output (control actuation)" means that the control is not performed even if the request has been issued because the control is set to be inhibited in the intermediate processing. The field with the slash means that the actuation cannot be performed because of the fail state.

According to this embodiment, when the fail state (failure) of the rotation-linear motion conversion mechanism 40 of any one of the disc brakes 31 is detected, the non-faulty disc brake 31 can be appropriately released.

Specifically, in this embodiment, when the state of the rotation-linear motion conversion mechanism 40 of the faulty disc brake 31 is stored as the "released state" in the storage section 19A, the electric actuator 43 of the non-faulty disc brake 31 is driven to the release side when the release request (release actuation request signal) based on the signal from the parking brake switch 18 or the actuation or release determination logic for the parking brake described above is issued. In this manner, the vehicle can run in a state in which the parking brakes of both the right and left disc brakes 31 are released. As a result, when the failure is detected, the running of the vehicle can be prevented from being excessively limited.

TABLE 1

| Input information | | | Intermediate processing | | Output (control actuation) | | | | | |
|---|---|---|---|---|---|---|---|---|---|---|
| | | State of brake mechanism on fail side | Engagement control allowance | Release control allowance | Left brake mechanism | | | Right brake mechanism | | |
| Brake mechanism in fail state | | (engaged/ released/ unknown) | on actuatable side | on actuatable side | With engagement request | With release request | Without request | With engagement request | With release request | Without request |
| Only one side in fail state | Left side fail | Left released state | Right allowed | Right allowed | | | | Start engagement control actuation | Start release control actuation | Non-actuated |
| | | Left engaged state or unknown state | Right allowed | Right inhibited | | | | Start release control actuation | Non-actuated | Non-actuated |
| | Right side fail | Right released state | Left allowed | Left allowed | Start engagement control actuation | Start release control actuation | Non-actuated | | | |
| | | Right engaged state or unknown state | Left allowed | Left inhibited | Start engagement control actuation | Non-actuated | Non-actuated | | | |

As the "input information" in the processing in Steps 1, 2, 3, and 6, which of (the rotation-linear motion conversion mechanisms 40 of) the right and left disc brakes 31 is in the fail state, and the state (engaged state, released state, or unknown state) of the disc brake 31 in the fail state are specified. In the "intermediate processing" performed in Steps 4, 5, 7, and 8, the allowance and inhibition of the engagement control and the release control of the disc brake 31 which can be actuated (is not in the fail state) are set based on the input information described above. In the "output (control actuation)" by the processing in Steps 9, 10, 11, and 12, the allowed engagement control or release control is started in response to the engagement request or the release request from the driver (parking brake switch 18) or the system (actuation or release determination logic for the parking brake described above) based on the input information On the other hand, when the state of the rotation-linear motion conversion mechanism 40 of the faulty disc brake 31 is stored as the "engaged state" in the storage section 19A, the electric actuator 43 of the non-faulty disc brake 31 is inhibited from being driven to the release side even when the release request (release actuation request signal) is issued based on the signal from the parking brake switch 18 or the actuation or release determination logic for the parking brake described above. In this manner, the vehicle can be prevented from running while the faulty disc brake 31 is in the engaged state and the non-faulty disc brake 31 is in the released state, that is, in a state in which only one of the right and left disc brakes 31 is engaged. As a result, drag of the disc brake 31 and the running of the vehicle in an unstable state can be prevented.

Further, even when the state of the rotation-linear motion conversion mechanism 40 of the faulty disc brake 31 is stored as the "unknown state" in the storage section 19A, the electric actuator 43 of the non-faulty disc brake 31 is inhibited from being driven to the release side even when the release request (release actuation request signal) is issued based on the signal from the parking brake switch 18 or the actuation or release determination logic for the parking brake described above. Thus, when which of the "engaged state" and the "released state" the state of the faulty disc brake 31 corresponds to cannot be specified, the non-faulty electric actuator 43 is not driven to the release side. In this manner, the possibility that the vehicle runs while any one of the right and left disc brakes 31 is in the engaged state can be lowered. As a result, the drag of the disc brake 31 and the running of the vehicle in the unstable state can be prevented at a higher level.

In the embodiment described above, the case where the disc brakes 31 having the electric parking brake function are used as the right and left rear-wheel brakes has been described as an example. However, the use of the disc brakes 31 is not limited thereto. For example, the disc brakes having the electric parking brake function may be used as brakes for all the wheels (all the four wheels). Specifically, the disc brakes having the electric parking brake function may be used as the brakes for at least one pair of the wheels of the vehicle.

Moreover, in the embodiment described above, the hydraulic disc brake 31 having the electric parking brake function has been described as an example. However, the brake device of the present invention is not limited thereto. For example, an electric disc brake which is not required to be supplied with the hydraulic pressure may be used. Moreover, the brake device of the present invention is not limited to the disc brake type brake device. For example, a drum brake type brake device may be used. Further, for example, a drum-in-disc brake obtained by providing a drum type electric parking brake to a disc brake may be used as the brake device.

According to the embodiment described above, the pressing-member retention mechanism can be appropriately released when the failure is detected.

Specifically, in the case where the failure occurs in the pressing-member retention mechanism of one of the pair of brake mechanisms and the state of the pressing-member retention mechanism of the faulty brake mechanism is stored as the released state, the control of the pressing-member release actuation of the electric motor in response to the release actuation request signal to the pressing-member retention mechanism of the other brake mechanism of the pair of brake mechanisms is allowed, that is, the state in which the control for the pressing-member release actuation can be performed is achieved. As a result, the vehicle can run in a state in which both the pressing-member retention mechanisms of the pair of brake mechanisms including the faulty brake mechanism are released. As a result, the running of the vehicle can be prevented from being excessively limited when the failure is detected.

On the other hand, in the case where the state of the pressing-member retention mechanism of the faulty brake mechanism is stored as the retained state, the control of the pressing-member release actuation of the electric motor in response to the release actuation request signal to the pressing-member retention mechanism of the other brake mechanism of the pair of brake mechanisms is inhibited, that is, the state in which the control for the pressing-member release actuation cannot be performed is achieved. In this manner, the vehicle can be prevented from running in a state in which the pressing-member retention mechanism of the faulty brake mechanism is retained and the pressing-member retention mechanism of the other brake mechanism is released. As a result, the drag of the friction member and the running of the vehicle in the unstable state can be prevented.

According to the embodiment of the present invention, in the case where the state of the pressing-member retention mechanism of the faulty brake mechanism is stored as the unknown state, the control of the pressing-member release actuation of the electric motor in response to the release actuation request signal to the pressing-member retention mechanism of the other brake mechanism of the pair of brake mechanisms is inhibited, that is, the state in which the control for the pressing-member release actuation cannot be performed is achieved. In this manner, when which of the retained state and the released state the state of the pressing-member retention mechanism of the faulty brake mechanism corresponds to cannot be specified, the possibility that the vehicle runs while the pressing-member retention mechanism of any one of the pair of brake mechanisms is in the retained state can be lowered. As a result, the drag of the friction member and the running of the vehicle in the unstable state can be prevented at a high level.

According to the embodiment of the present invention, the failure of the pressing-member retention mechanism can be determined in accordance with energization conditions of the electric motors and conditions of the internal circuit of the control means.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2012-262548, filed on Nov. 30, 2012. The entire disclosure of Japanese Patent Applications No. 2012-262548, filed on Nov. 30, 2012 including specification, claims, drawings and summary is incorporated herein by reference in its entirety.

What is claimed is:

1. A brake device, comprising:
a pair of brake mechanisms for each thrusting a friction member with use of a pressing member based on an operation of a brake pedal, the brake mechanisms being respectively provided to a pair of wheels of a vehicle, the friction members being provided so as to be abuttable against rotary members which rotate with the respective wheels;
pressing-member retention mechanisms respectively provided to the brake mechanisms for thrusting the pressing members by electric motors to retain the thrust pressing members; and
control means for performing switching between allowance and inhibition of control of the electric motors in response to an actuation request signal to store one of a retained state and a released state of the pressing members by the respective pressing-member retention mechanisms and to detect a failure of each of the pressing-member retention mechanisms,
wherein, when it is detected that one of the pair of the pressing-member retention mechanisms is faulty and a state of the one of the pressing-member retention mechanisms in which the fault is detected is stored as the released state, the control means allows a release actuation by the other of the pair of the pressing-member retention mechanisms in response to a release actuation request signal to the other of the pair of the pressing-member retention mechanism, and wherein, when it is detected that the one of the pair of the pressing-member retention mechanisms is faulty and a state of the one of the pressing-member retention mechanisms in which the fault is detected is stored as the retained state, the control means does not allow the release actuation by the other of the pair of the pressing-member retention mechanisms in response to the release actuation request signal to the other of the pair of the pressing-member retention mechanisms.

2. A brake device according to claim 1, wherein:
the control means stores the retained state when retention of the pressing member by each of the pressing-member retention mechanisms is completed and stores the released state when release of the pressing member by each of the pressing-member retention mechanisms is completed; and
the control means stores the state of each of the pressing members as an unknown state, when driving of the electric motor in response to an actuation request signal is terminated before one of the retention and the release of the pressing member is completed.

3. A brake device according to claim 2,
wherein, when it is determined that the one of the pair of the pressing-member retention mechanisms is faulty and the state of the one of the pair of the pressing-member retention mechanisms in which the fault is detected is stored as the unknown state, the control means does not allow the release actuation of the other of the pressing-member retention mechanisms in response to the release actuation request signal to the other of the pressing-member retention mechanisms.

4. A brake device according to claim 3, wherein the control means determines occurrence of the failure of the pressing-member retention mechanisms in accordance with energization conditions of the electric motors and conditions of an internal circuit of the control means.

5. A brake device according to claim 1, wherein the control means determines occurrence of the failure of the pressing-member retention mechanisms in accordance with energization conditions of the electric motors and conditions of an internal circuit of the control means.

6. A brake device according to claim 1, wherein the control means determines occurrence of the failure of the pressing-member retention mechanisms based on current values supplied to the electric motors.

7. A brake device, comprising:
brake mechanisms respectively provided to wheels of a vehicle to perform braking based on an operation of a brake pedal;
braked-state retention mechanisms respectively provided to a pair of right and left brake mechanisms of the brake mechanisms, for bringing the wheels into a braked state by driving electric motors and for retaining the braked state; and
control means for performing switching between allowance and inhibition of control of the electric motors in response to an actuation request signal to store one of a retained state and a released state achieved by each of the braked-state retention mechanisms and to detect a failure of each of the braked-state retention mechanisms,
wherein, when it is detected that one of the pair of the braked-state retention mechanisms is faulty and a state of the one of the braked-state retention mechanisms in which the fault is detected is stored as the released state, the control means allows release actuation of the other of the braked-state retention mechanisms in response to a release actuation request signal to the other of the pair of the braked-state retention mechanism, and
wherein, when it is detected that the one of the pair of the braked-state retention mechanisms is faulty and a state of the one of the braked-state retention mechanisms in which the fault is detected is stored as the retention state, the control means allows release actuation of the other of the braked-sate retention mechanisms in response to the release actuation request signal to the other of the pair of the braked-state retention mechanisms.

8. A brake device according to claim 7, wherein:
the control means stores the retained state when retention of the braked state by each of the braked-state retention mechanisms is completed and stores the released state when release of the braked state by each of the braked-state retention mechanisms is completed; and
the control means stores a state of each of the braked-state retention mechanisms as an unknown state when driving of the electric motor in response to an actuation request signal is terminated before one of the retention and the release of the braked state is completed.

9. A brake device according to claim 8,
wherein, when it is detected that the one of the pair of the braked-state retention mechanisms is faulty and the state of the one of the pair of the braked-state retention mechanisms in which the fault is detected is stored as the unknown state, the control means does not allow the release actuation by the other of the pair of the braked-state retention mechanisms in response to the release actuation request signal to the other of the pair of the braked-state retention mechanisms.

10. A brake device according to claim 7, wherein the control means determines occurrence of the failure of the braked-state retention mechanisms in accordance with energization conditions of the electric motors and conditions of an internal circuit of the control means.

11. A brake device according to claim 7, wherein the control means determines occurrence of the failure of the braked-state retention mechanisms based on current values supplied to the electric motors.

12. A brake device, comprising:
a pair of brake mechanisms for each thrusting a friction member with use of a pressing member based on an operation of a brake pedal, the brake mechanisms being respectively provided to a pair of wheels of a vehicle, the friction members being provided so as to be abuttable against rotary members which rotate with the pair of wheels of the vehicle;
pressing-member retention mechanisms provided to each of the brake mechanisms for thrusting the pressing members by electric motors to retain the thrust pressing members; and
control means for performing switching between allowance and inhibition of control of the electric motors in response to an actuation request signal to store one of a retained state and a released state of the pressing members by the respective pressing-member retention mechanisms and to detect a failure of each of the pressing-member retention mechanisms,
wherein the control means stores the retained state when retention of the pressing member by each of the pressing-member retention mechanisms is completed and stores the released state when release of the pressing member by each of the pressing-member retention mechanisms is completed; and
the control means stores the state of each of the pressing members retention mechanism as an unknown state when driving of the electric motor in response to an actuation request signal is terminated before one of the retention and the release of the pressing member is completed, wherein, when it is detected that one of the pair of the pressing member retention mechanisms is faulty and a state of the one of the pair of the pressing-member retention mechanisms in which the fault is detected is stored as the released state, the control means achieves a state in which a release actuation by the other of the pair of the pressing-member retention mechanisms in response to a release actuation request signal to the other of the pair of the pressing-member retention mechanisms is allowed to be controlled, and wherein, when the state of the one of the pressing member retention mechanisms in which a fault is detected is stored as the retained state or the unknown state, the control means does not allow the release actuation by the other of the pair of the pressing-member retention mechanisms in response to the release actuation request signal to the other of the pair of the pressing-member retention mechanisms.

13. A brake device according to claim 12, wherein the control means determines occurrence of the failure of the pressing-member retention mechanisms in accordance with energization conditions of the electric motors and conditions of an internal circuit of the control means.

14. A brake device according to claim 12, wherein the control means determines occurrence of the failure of the pressing-member retention mechanisms based on current values supplied to the electric motors.

* * * * *